United States Patent [19]
Nitta et al.

[11] Patent Number: 5,604,389
[45] Date of Patent: Feb. 18, 1997

[54] SPINDLE MOTOR

[75] Inventors: Nobuya Nitta; Saburou Kikuchi; Masahiro Inoue, all of Gunma, Japan

[73] Assignee: NEC Corporation, Tokyo, Japan

[21] Appl. No.: 194,315

[22] Filed: Feb. 10, 1994

[30] Foreign Application Priority Data

Feb. 10, 1993 [JP] Japan .................. 5-022241

[51] Int. Cl.⁶ .............. H02K 7/14; H02K 1/00; H02K 1/14
[52] U.S. Cl. ............. 310/67 R; 310/216; 310/209; 310/254
[58] Field of Search .............. 310/67 R, 91, 310/40 MM, 216, 217, 218, 191, 209, 254; 360/98.07, 99.04, 99.08

[56] References Cited

U.S. PATENT DOCUMENTS

| | | | |
|---|---|---|---|
| 3,441,760 | 4/1969 | Collens | 310/91 |
| 4,129,796 | 12/1978 | Papst | 310/67 R |
| 4,336,470 | 6/1982 | Gutris | 310/67 R |
| 4,417,166 | 11/1983 | Perucchi et al. | 310/254 |
| 4,439,703 | 3/1984 | Kohzai et al. | 310/216 |
| 4,626,727 | 12/1986 | Janson | 310/67 R |
| 4,902,941 | 2/1990 | Merkle et al. | 310/216 |
| 5,132,856 | 7/1992 | Takahashi | 360/99.08 |
| 5,170,083 | 12/1992 | Burgbacher | 310/254 |
| 5,317,225 | 5/1994 | Miyaji et al. | 310/67 R |
| 5,319,270 | 6/1994 | Tanaka et al. | 310/67 R |
| 5,436,517 | 7/1995 | Ogawa | 310/91 |

Primary Examiner—Clayton E. Laballe
Attorney, Agent, or Firm—Sughrue, Mion, Zinn, Macpeak & Seas

[57] ABSTRACT

A spindle motor is disclosed. The spindle motor is provided with a magnet fitted to a rotor, and a stator core, around which coils are wound. Openings are provided in the base plate. A part of each coil is inserted into one of the openings. The thickness of the spindle motor is reduced by the thickness of the inserted coils. Supplementary members are fitted to the teeth of the stator core. The supplementary members protrude in a direction away from the base plate. The supplementary members reduce the axial component of the magnetic force acting between the stator core and the magnet.

4 Claims, 11 Drawing Sheets

SPINDLE MOTOR

BACKGROUND OF THE INVENTION

The present invention relates to a spindle motor used in flexible disk drives among other things.

Figure 25:
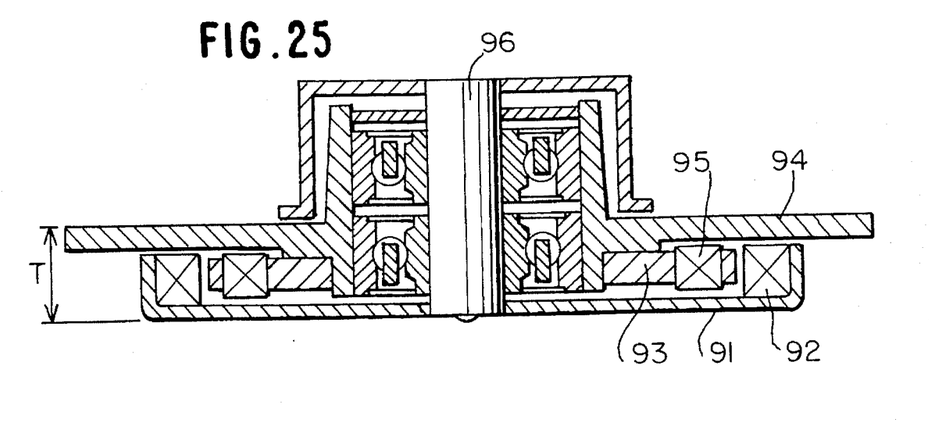
FIG. 25 is a diagram illustrating the prior art.

One example of spindle motor structure according to the prior art is described in the U.S. Pat. No. 5,132,856. Referring to FIG. 25 here based on FIG. 1 of said Gazette, a rotor 91 is fitted to a shaft 96, and a magnet 92 is fitted to the rotor 91. The magnet 92 faces the tip of a stator core 93, which is fitted on a base plate 94. Around the stator core 93 is wound a coil 95. By supplying a current to the coil 95, a magnetic flux is generated at the tip of the stator core, and this magnetic flux gives the magnet 92 a magnetic force, which rotates the rotor 91.

In recent years, computers have been quickly reduced in size, and in this connection, floppy disk drives to be mounted on computers are also required to be reduced in size. Among the dimensions of floppy disk drives, the width and the length have been appreciably reduced, and accordingly, the development of a technology to make available thinner floppy disk drives is called for. In order to reduce the thickness T of the spindle motor shown in FIG. 25, either the stator core 93 or the coil 95 has to be made thinner.

However, thinning the stator core 93 would reduce the magnetic flux passing the poles of the stator core 93, because the stator core 93 would become magnetically saturated. The poles of the stator core 93 here refer to the radially extending parts of the stator core 93. A decrease in the magnetic flux passing the poles of the stator core 93 would reduce the torque of the spindle motor.

Or, if the diameter of the wire constituting the coil 95 is reduced to make the coil 95 thinner, its electric resistance will increase and thereby invite a decrease in the current passing the coil 95, which would in turn reduce the magnetic flux generated by the coil 95. A decrease in the magnetic flux generated by the coil 95 would invite a drop in the magnetic flux passing the stator core 93, and thereby the magnetic force given to the magnet 92 is reduced. This reduction of the magnetic force results in a decrease in the torque of the spindle motor.

As explained above, any technology to thin the spindle motor by reducing the thickness of the stator core 93 or of the coil 93 would entail a decrease in the torque of the spindle motor.

SUMMARY OF THE INVENTION

An object of the present invention is to provide a spindle motor which is thin and yet provides a large torque.

To achieve this object, according to one aspect of the invention exemplified by a first preferred embodiment, an opening is provided in the base plate and part of the coil is inserted into this opening.

Another object of the invention is to improve the rotational efficiency and stability of the spindle motor in the first preferred embodiment. To achieve this object, according to another aspect of the invention exemplified by second through fifth preferred embodiments, the stator teeth are provided with a protruding part, which protrudes in a direction away from the base plate.

According to still another aspect of the invention exemplified by a sixth preferred embodiment, parts of the stator poles of the stator core are bent in a direction away from the base plate.

DETAILED DESCRIPTION OF THE PREFERRED EMBODIMENTS

First Embodiment

Next will be described a first preferred embodiment of the present invention with reference to drawings.

Figure 1:
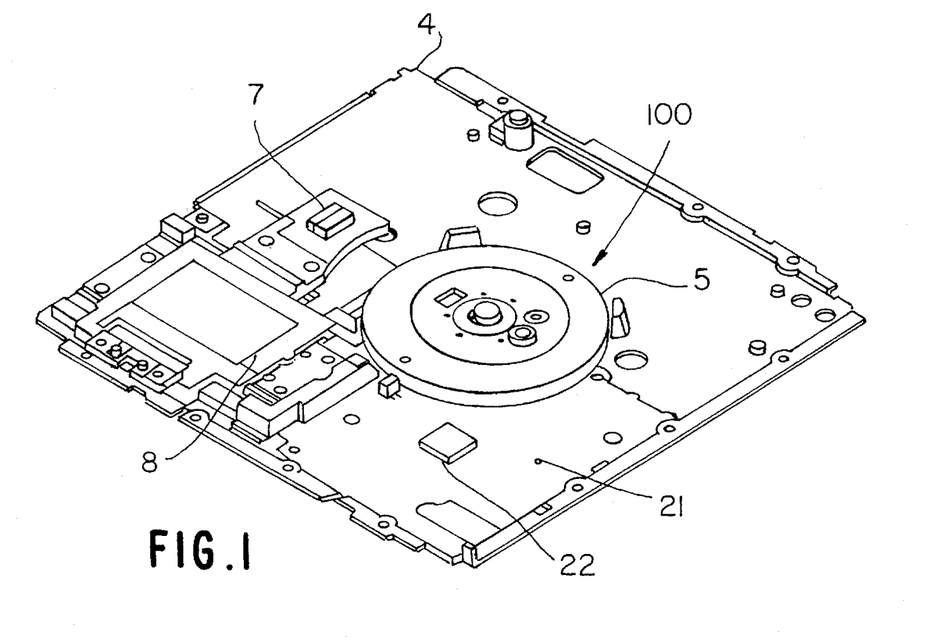
FIG. 1 is an oblique view of the spindle motor 100 in the first preferred embodiment of the invention, mounted on a floppy disk drive.

Referring to FIG. 1, a spindle motor 100 is mounted on a floppy disk drive. The spindle motor 100 comprises a disk rotor 5 and a flat base plate 4. On the base plate 4 is also mounted a linear pulse motor 8 besides the spindle motor 100. The linear pulse motor 8 is provided with a head 7. On the base plate 4 is further mounted a printed wiring board (PWB) 21, which is mounted with a control IC 22.

Figure 2:
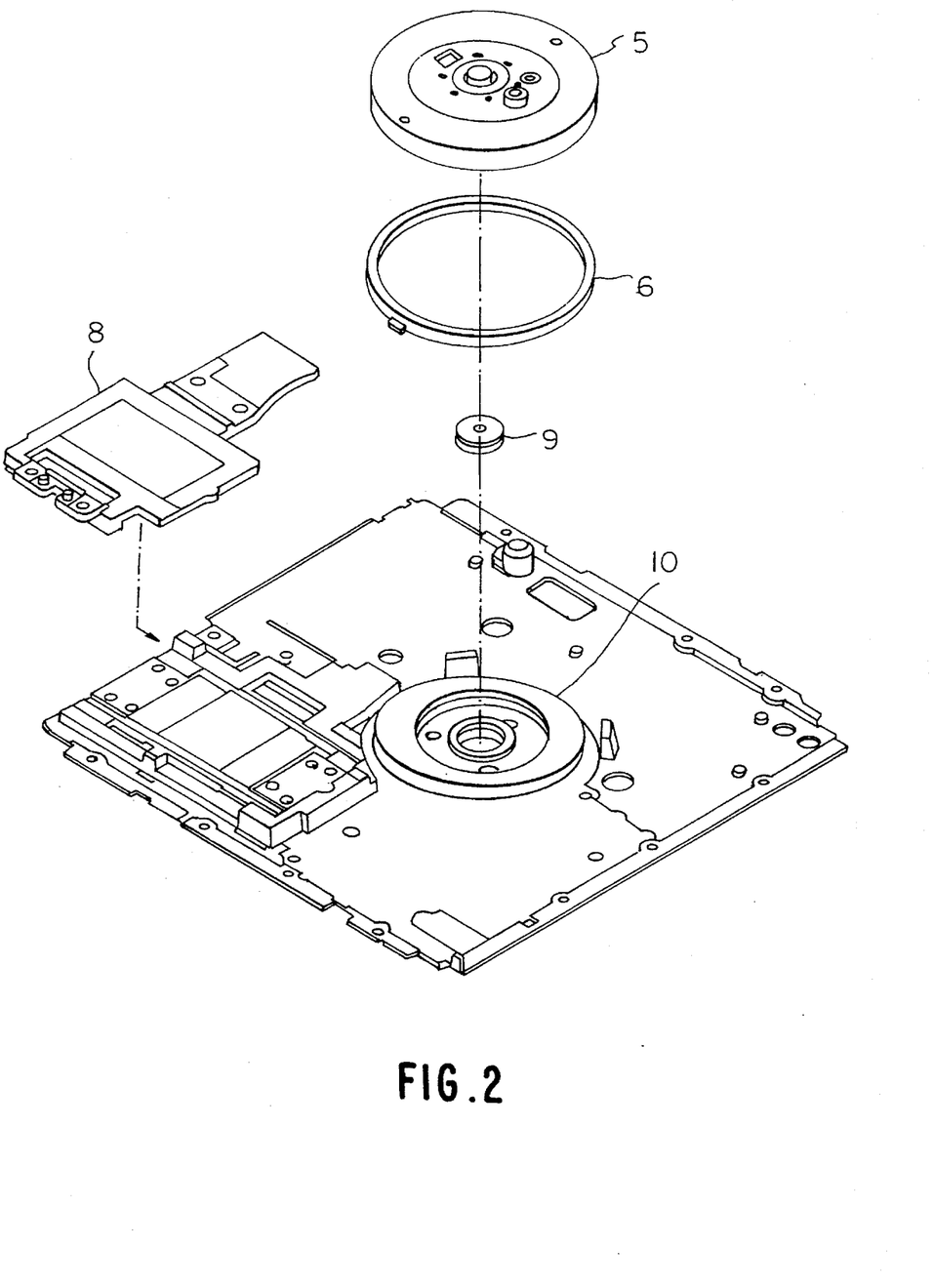
FIG. 2 is an exploded view illustrating the internal structure of the spindle motor 100 in the first embodiment.

Referring to FIG. 2, the spindle motor 100 comprises the rotor 5, a magnet 6, a bearing 9 and a drive coil 10. Around the rotor 5 is formed a cylindrical part. The magnet 6, formed in a circular shape, is fitted into the cylindrical part of the rotor 5. The rotor 5 is installed rotatably on the base plate 4 with the bearing 9 in-between.

Figure 3:
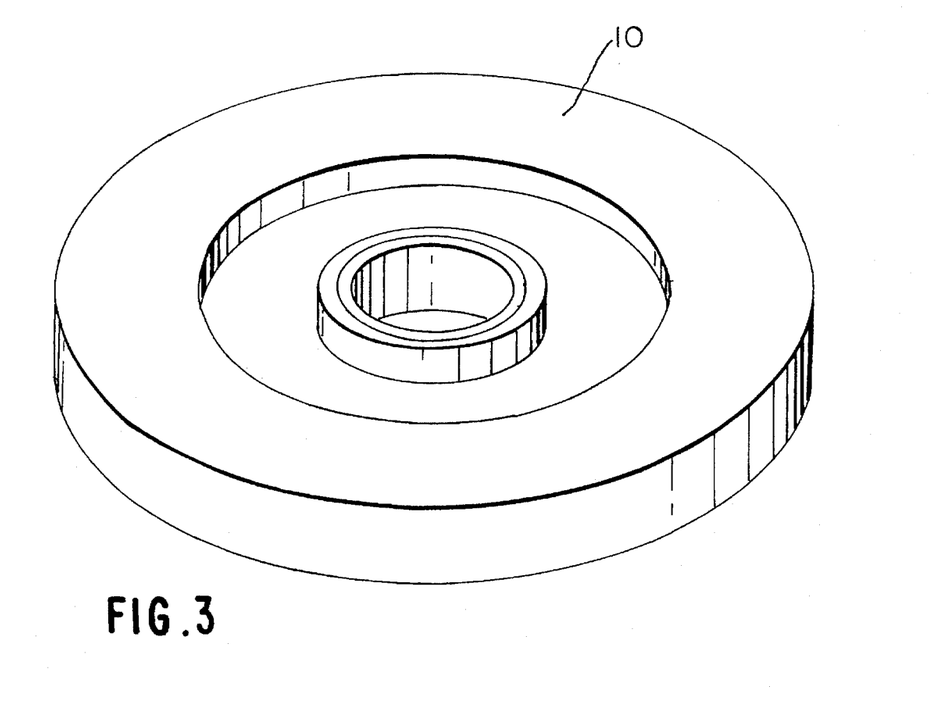
FIG. 3 is an oblique view illustrating the external appearance of the drive coil 10 in the first embodiment.

Referring to FIG. 3, the drive coil 10 is molded in resin. The molding is accomplished after a stator core 1, to be described below, and the PWB 3 are fitted to the base plate 4. The molded drive coil 10 is in a cylindrical shape, about 35 mm in diameter.

Figure 4:
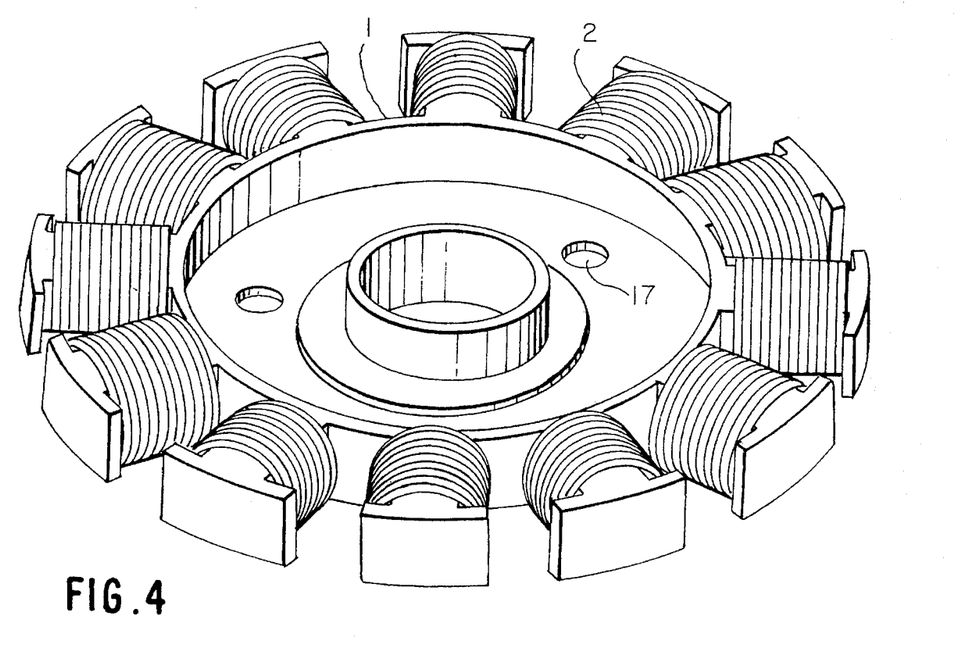
FIG. 4 is an oblique view illustrating the structure of the stator core 1 and the coil 2 in the first embodiment.

Referring to FIG. 4, inside the drive coil 10 are sealed the stator core 1 and coils 2. In the bottom plate of the stator core 1 are formed three holes 17. The stator core 1 and the coils 2 are as thick as conventional ones.

Figure 5:
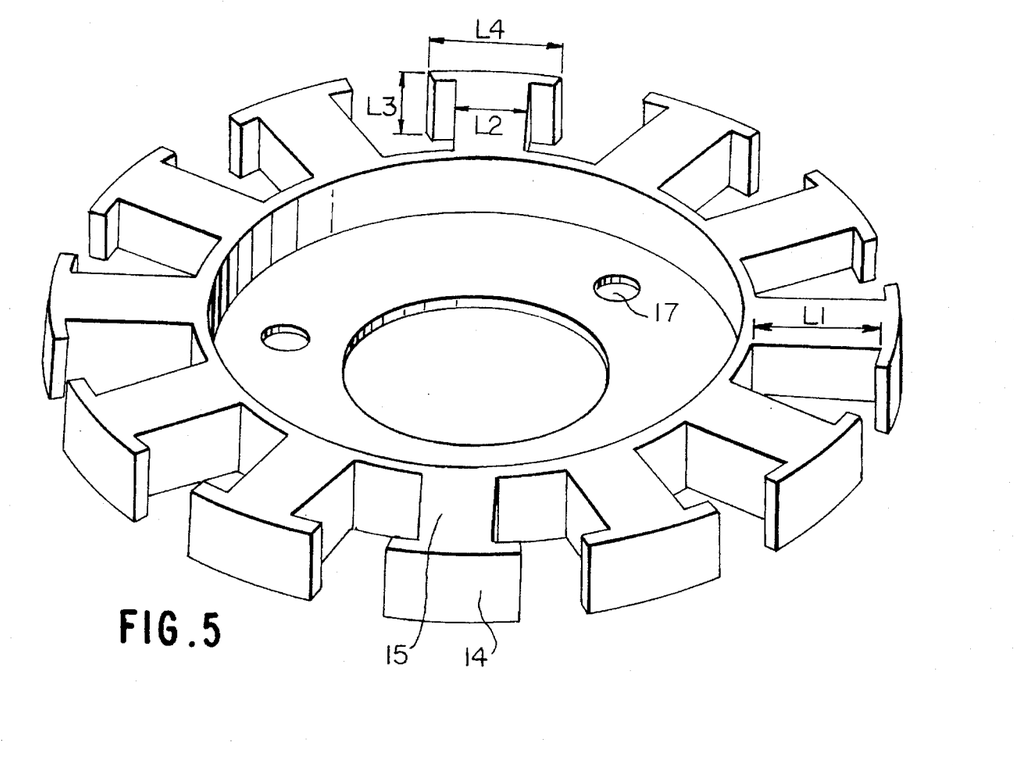
FIG. 5 is an oblique view illustrating the structure of the stator core 1 in the first embodiment.

Referring to FIG. 5, the stator core 1 has 12 radially extending stator poles 15. Around the stator poles 15 are wound the coils 2. At the tip of each stator pole 15 is provided a stator tooth 14, which is shaped to protrude in the circumferential direction. The stator core 1 consists of laminated plate-shaped members, which are made of magnetic steel such as silicon steel, and constitutes a part of a magnetic circuit.

FIG. 5 only schematically illustrates the structure of the stator core 1, but does not show its precise dimensions. The dimensions of the members are as follows. The diameter of the stator core 1 is about 35 mm. The length L1, width L2 and height L3 of its poles are about 5 mm, 2 mm and 1.8 mm, respectively. The width L4 of each stator tooth is about 7 mm.

Figure 6:
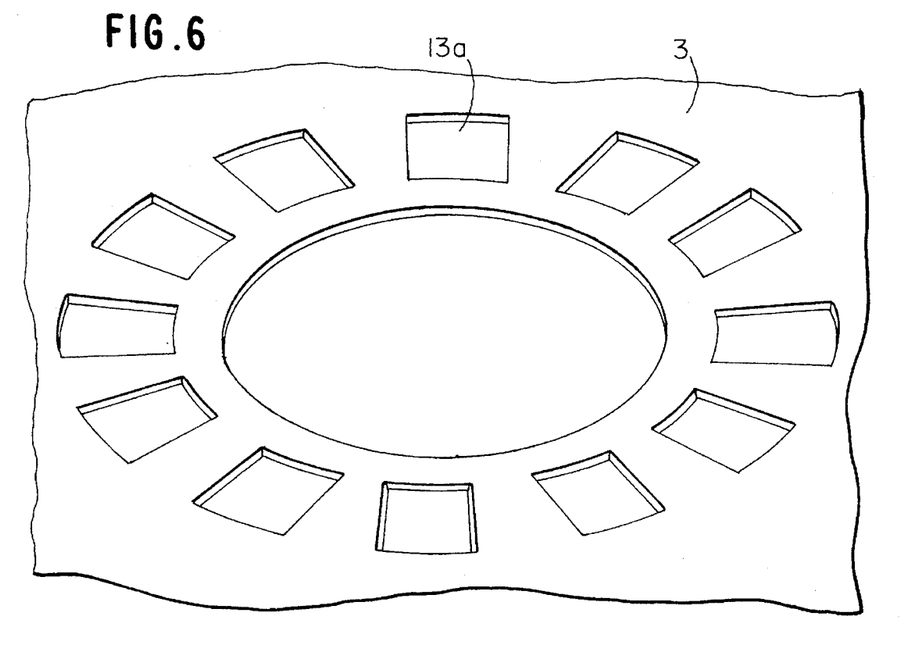
FIG. 6 is an oblique view illustrating the structure of the printed wiring board 3 in the first embodiment.

Referring to FIG. 6, the PWB 3 has 12 openings 13a, each corresponding to one of the coils 2.

Figure 7:
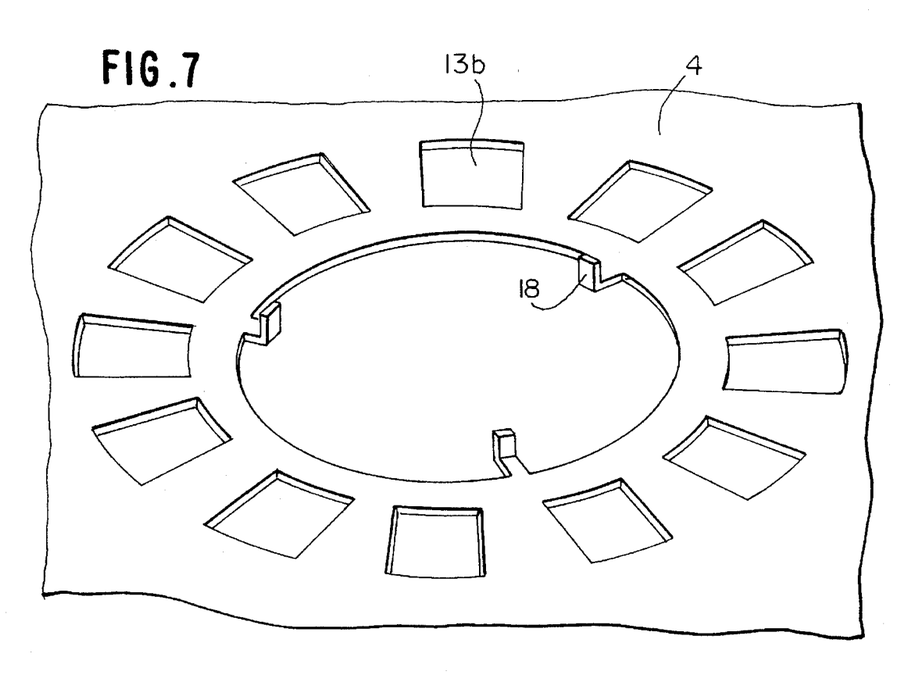
FIG. 7 is an oblique view illustrating the structure of the base plate 4 in the first embodiment.

Referring to FIG. 7, the base plate 4 has 12 openings 13b, each corresponding to one of the coils 2, and is also provided with three pawls to be inserted into holes 17.

Figure 8:
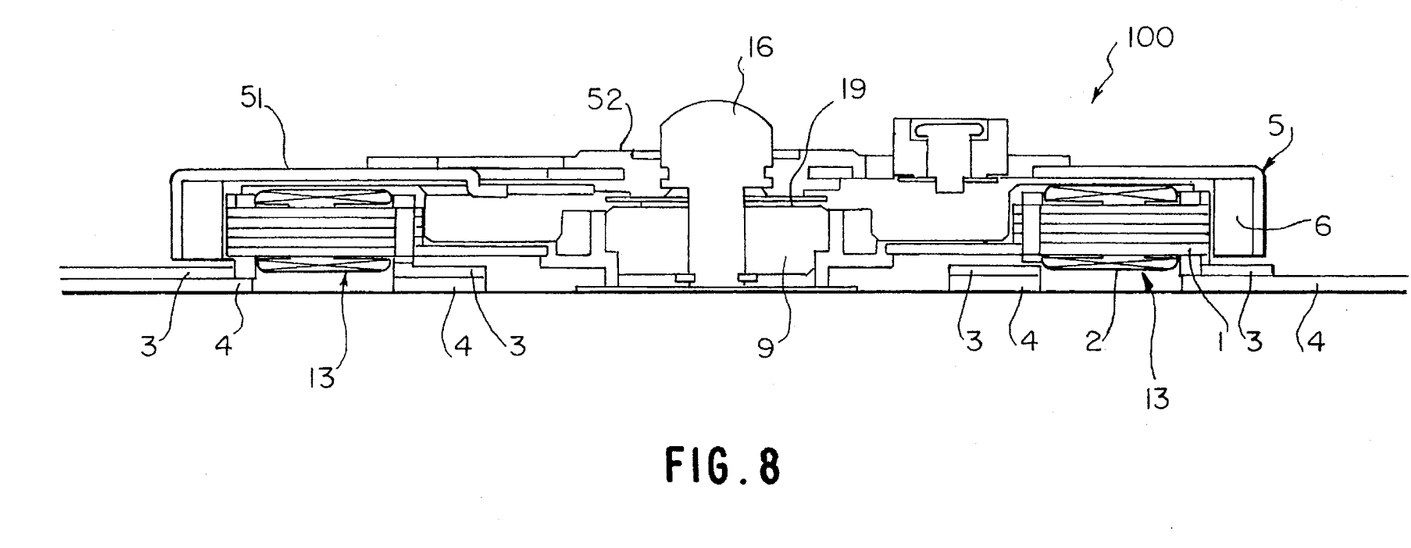
FIG. 8 is a cross-sectional view illustrating the structure of the spindle motor 100 in the first embodiment.

Referring to FIG. 8, the spindle motor 100 has the rotor 5 and the stator core 1. The rotor 5 consists of a rotor yoke 51 constituting the peripheral part and a central part 52. The rotor yoke 51, made of a magnetic material, Constitutes a part of the magnetic circuit. The central part 52 is formed of resin. The top face of the central face 52 supports a hub of a flexible disk. In the following description, this top face of the central part 52 will be called the hub face. The rotor 5 is fitted to a shaft 16. Between the rotor 5 and the bearing 9 is provided a spacer 19, which consists of two members of a less frictional material. As the spacer 19 reduces the frication between the rotor 5 and the bearing 9, the rotor 5 smoothly rotates.

The rotor 5 is fitted with a circular-shaped magnet 6.

On the PWB 3 is formed wiring having a wave shape known as the FG pattern, which generates a rotation control signal in response to the passage of the magnet 6. This rotation control signal is used for controlling the rotation of the rotor 5.

The PWB 3 is fixed over the base plate 4. The openings 13a of the PWB 3 and the openings 13b of the base plate 4 are matched. The matched pairs of the openings 13a and 13b form twelve openings 13.

The stator core 1 is fixed to the base plate 4 by fitting the pawls 18 of the base plate 4 into the holes 17 of the stator core 1. As stated above, the coils 2 are wound around the poles of the stator core 1. The lower part of each coil 2 is inserted into the corresponding opening 13.

The teeth 14 of the stator core 1 face the magnet 6. The gap between the stator teeth 14 and the magnet 6 is about 0.2 mm.

The stator core 1 is formed by stacking five plate-shaped members.

By supplying an electric current to the coils 2, a magnetic flux is generated at the tips of the stator core 1. The magnetic force acting between this magnetic flux and the magnet 6 rotates the rotor 5.

Figure 9:
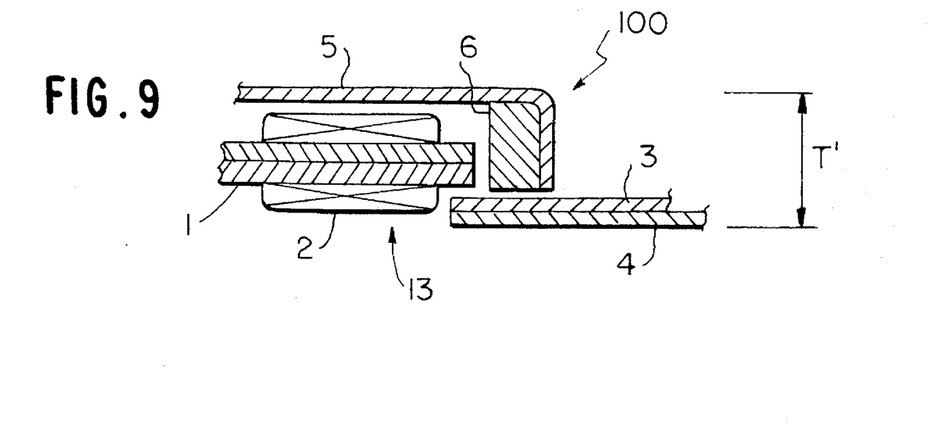
FIG. 9 is a cross-sectional view schematically illustrating the structure of the spindle motor 100 in the first embodiment.

FIG. 9 gives a schematic view of the part around the opening 13 of the structure illustrated in FIG. 8. In FIGS. 9, 10, 13, 14, 15, 16, 17, 18, 19, 20, 21, 22, 23 and 24, the number of plate-shaped members constituting the stator core 1 is reduced to two for the sake of simpler description. Referring to FIG. 9, the lower part of each coil 2 is inserted into the corresponding opening 13. The stator core 1 is positioned lower than in the conventional arrangement. The lower position of the stator core 1 helps to reduce the thickness of the spindle motor 100 as compared with the prior art.

Figure 10A:
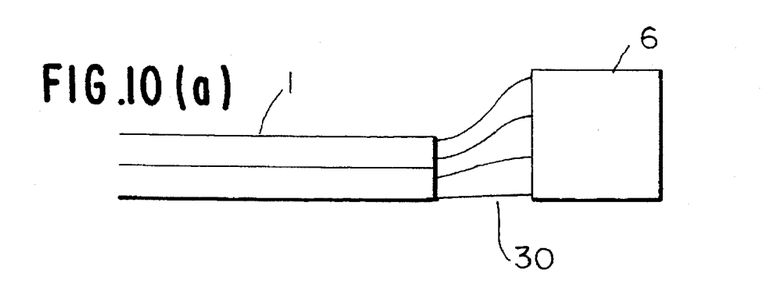
FIG. 10(a) is a cross-sectional view typically illustrating the magnetic field line pattern 30 in the structure shown in FIG. 9.
Figure 10B:
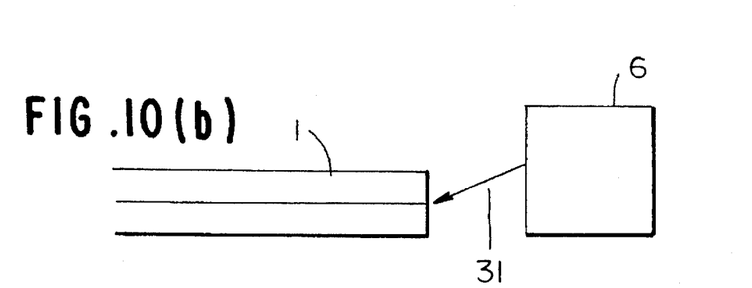
FIG. 10(b) is a cross-sectional view typically illustrating the magnetic force 31 acting between the stator core 1 and the magnet 6 in the structure shown in FIG. 9.
Figure 10C:
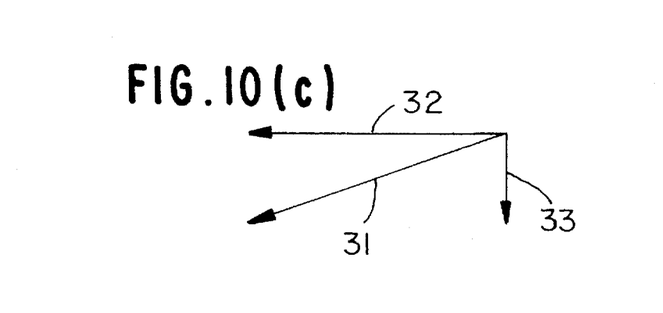
FIG. 10(c) is a diagram illustrating the radial component 32 and the axial component 33 of the magnetic force 31 shown in FIG. 10(b)

In the structure illustrated in FIG. 9, the magnetic field line pattern between the stator core 1 and the magnet 6 is such as shown in FIG. 10(a). Referring to FIG. 10(b), a magnetic force 31 acts between the stator core 1 and the magnet 6. On account of the lower position of the stator core 1, the magnetic force 31 is inclined downward. Referring now to FIG. 19(c), the magnetic force 31 has not only a radial component 32 but also an axial component 33. The lower position of the stator core 1 has resulted in a greater axial component 33 in relative terms.

As described above, the spindle motor 100, which is the first embodiment of the invention, has openings 13 in its base plate 4, and the lower parts of the coils 2 are inserted into these openings. This structure makes this spindle motor 100 thinner than the conventional one. At the same time, the stator core 1 and the coils 2 of this spindle motor 100 according to the invention are as thick as their respective counterparts in the conventional spindle motor. Accordingly this spindle motor 100 has a substantially equal torque to the conventional one.

Second Embodiment

Now will be described a second preferred embodiment of the present invention.

The object of this embodiment is to further improve the performance of the spindle motor 100, which is the first embodiment. In order to achieve this object, the teeth 14 of the stator core 1 of this embodiment are fitted with supplementary members 11. In other respects of the structure than the supplementary members 11, this embodiment is the same as the first.

First, the background of this second embodiment will be described.

As stated above, in the spindle motor 100 of the first embodiment, the relative proportion of the axial component 33 of the magnetic force 31 is enlarged by the lower positioning of the stator core 1. The greater proportion of the axial component 33 gives rise to the following phenomena.

First is the phenomenon that the rotational efficiency of the spindle motor 100 is deteriorated. Referring again to FIG. 8, the axial component 33 of the magnetic force 31 presses the rotor 5 downward with the result that the two members constituting the space 19' are tightly pressed against each other. This invites an increase in the frictional force acting between the two members, and the increased frictional force in the spacer 19 brings down the rotational efficiency of the spindle motor 100.

Second, the shaft 16 and the hub face 52 are deflected. This phenomenon arises in the following process. The axial component of the magnetic force 31 presses down the magnet 6 fitted to the rotor 5. The distance between the stator core 1 and the magnet 6 varies delicately from one part of the rotor 5 to another. This unevenness results from errors in the manufacturing processes of the stator core 1 and the magnet 6. Where the stator core 1 and the magnet 6 are closer to each other, the force to press down the magnet 6 is greater. Where the distance between them is longer, that force is smaller. Thus the magnitude of the downward impulsive force differs from one part of the rotor 5 to another. This deflects the rotor 5, and the deflection of the rotor 5 deflects the shaft 16 and the hub face 52.

Third is the fluctuation of the rotational speed of the spindle motor 100, a phenomenon known as "wow". The wow arises in the following process. As stated above, the axial component 33 of the magnetic force 31 deflects the shaft 16 and the magnet 6. The deflection of the rotor 5 shifts the mutually contacting parts of the shaft 16 and the bearing 9 from moment to moment, resulting in moment-to-moment variations in the frictional force arising between the shaft 16 and the bearing 9. The variations in frictional force between the shaft 16 and the bearing 9 invite the wow of the spindle motor 100.

Wow also arises in the following process. As described above, the axial component of the magnetic force 31 deflects the rotor 5, and the deflection of the rotor 5 disturbs the rotation control signal. The disturbed rotation control signal invites trouble in the control to rotate the rotor 5 at a constant speed.

As explained above, the spindle motor 100 of the first embodiment is subject to such phenomena as deteriorated rotational efficiency, deflections of the shaft 16 and the hub face 52, and the aggravation of wow. These undesirable phenomena are due to the axial component 33 of the magnetic force 31. The second through sixth embodiments are intended to avoid these phenomena by reducing the axial component 33 of the magnetic force 31.

Next will be described the structure of this second embodiment.

Figure 11:
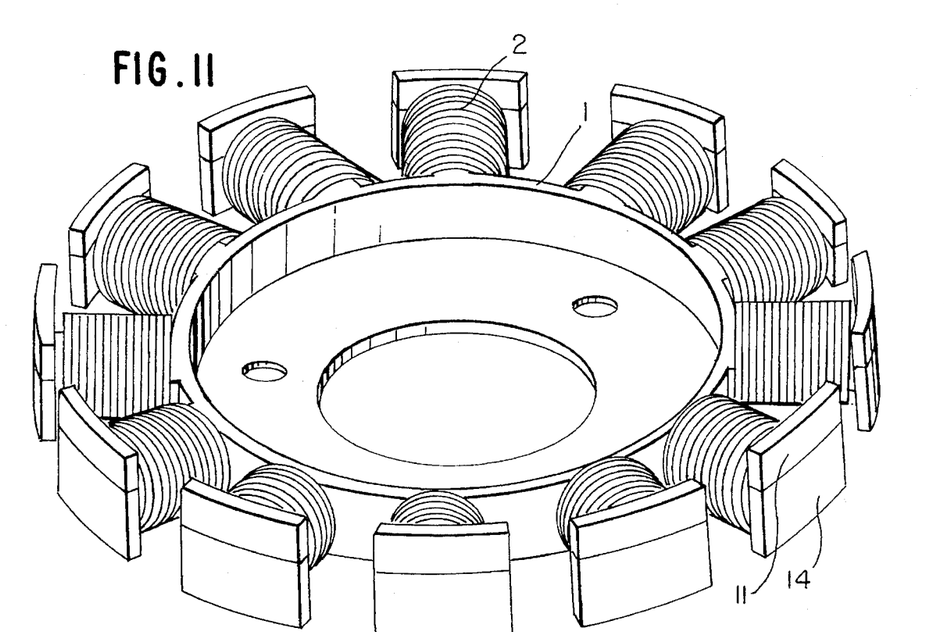
FIG. 11 is an oblique view illustrating the structure of the stator core 1 and the coil 2 in the second embodiment.

Referring to FIG. 11, the teeth 14 of the stator core 1 of the drive coil 10 are fitted with the supplementary members 11. The structure of the stator core 1 except the supplementary members 11 is the same as that of the first embodiment.

Figure 12:
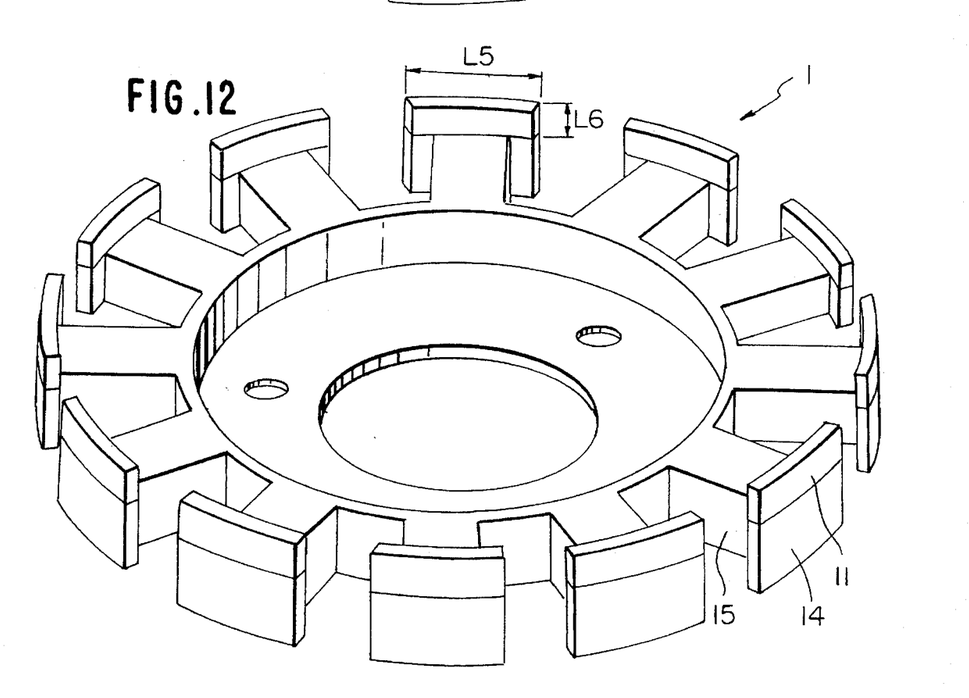
FIG. 12 is an oblique view illustrating the structure of the stator core 1 in the second embodiment.

Referring to FIG. 12, the width L5 of the supplementary members 11 is about 7 mm, and their height L6, about 0.4 mm. The dimensions of all other parts are the same as those of the corresponding parts of the first embodiment.

Figures 13A, 13B, 14:
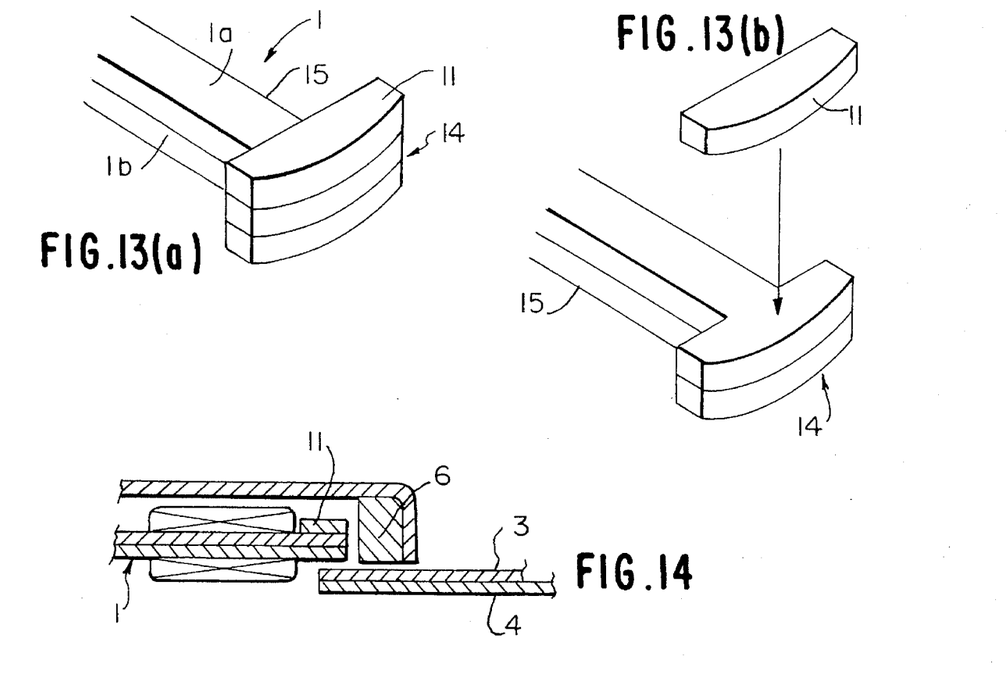
FIG. 13(a) is an oblique view schematically illustrating the stator teeth 14 of the stator core 1 in the second embodiment.
FIG. 13(b) is an exploded view schematically illustrating the structure of the stator teeth 14 of the stator core 1 in the second embodiment.
FIG. 14 is a cross-sectional view schematically illustrating the structure of the spindle motor 100 in the second embodiment.

Referring to FIGS. 13(a) and (b), the stator core 1 plate-shaped members 1a and 1b, both made of magnetic steel, such as silicon steel. The plate-shaped members 1a and 1b are stacked one over the other, and their teeth are T-shaped. These T-shaped parts are stacked one over the other to form the teeth 14.

The supplementary members 11 are bonded over the stator teeth 14. The supplementary members 11 can as well be fitted by the same pressure-fitting technique as that is used for stacking the plate-shaped members 1a and 1b. The supplementary members 11 are plate-shaped members of the same contour as the stator teeth 14, which are made of the same material as the plate-shaped members 1a and 1b.

Referring to FIG. 14, the supplementary members 14 protrude away from the base plate.

Figure 15A:
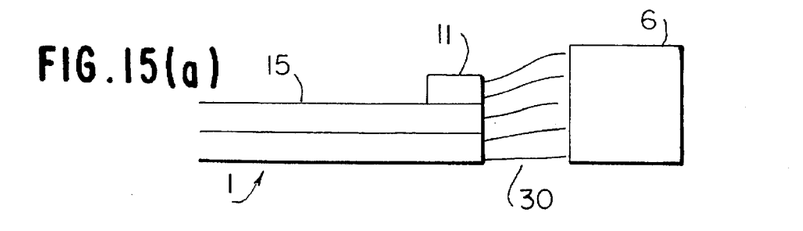
FIG. 15(a) is a cross-sectional view typically illustrating the magnetic field line pattern 30 in the structure shown in FIG. 14.
Figure 15B:
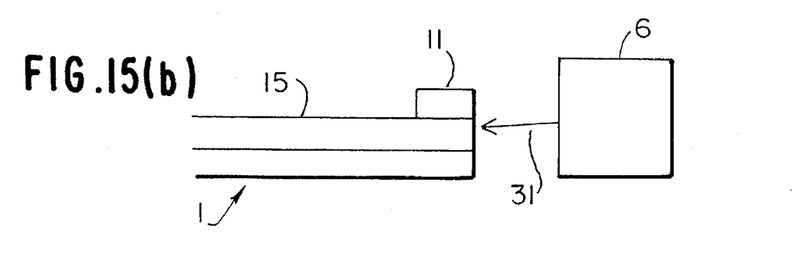
FIG. 15(b) is a cross-sectional view typically illustrating the magnetic force 31 acting between the stator core 1 and the magnet 6 in the structure shown in FIG. 9.
Figure 15C:
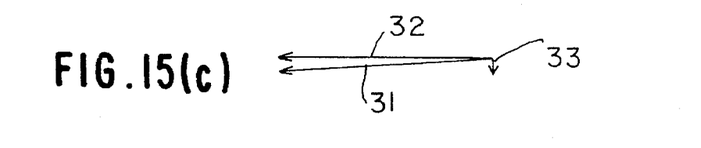
FIG. 15(c) is a diagram illustrating the radial component 32 and the axial component 33 of the magnetic force 31 shown in FIG. 15(b)

In the structure illustrated in FIG. 14, the magnetic field line shown in FIG. 15(a) is formed between the supplementary members 11 and the magnet 6. Referring to FIG. 15(b), the magnetic force 31, generating in the magnet 6, is so corrected as to act in a horizontal direction. Referring to FIG. 15(c), the axial component 33 of the magnetic force 31 is smaller than in the first embodiment shown in FIG. 10(c).

As described above, in this embodiment, the teeth 14 of the stator core 1 are provided with supplementary members 11 protruding in a direction away from the base plate 4. The supplementary members 11 reduce the axial component 33 of the magnetic force 31. As a result, the spindle motor 100 of this embodiment is improved over that of the first embodiment in rotational efficiency, deflections of the shaft 16 and the hub face 52, and wow.

Third Embodiment

Next will be described a third preferred embodiment of the present invention.

The characteristic of this embodiment consists in the structure of the teeth 14 of the stator core 1. All other parts are structured in the same manner as the second embodiment.

Figure 16A:
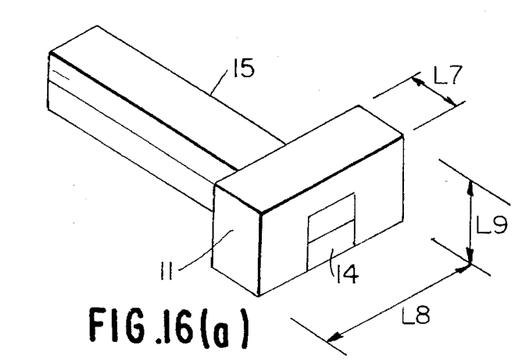
FIG. 16(a) is an oblique view schematically illustrating the stator teeth 14 of the stator core 1 in the third embodiment.
Figure 16B:
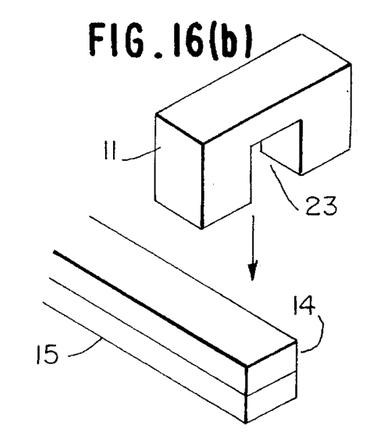
FIG. 16(b) is an exploded view schematically illustrating the structure of the stator teeth 14 of the stator core 1 in the third embodiment.

Referring to FIG. 16(a), the teeth 14 of the stator core 1 of this embodiment have the same contour as the stator poles 15.

The supplementary members 11 are rectangularly shaped. The approximate dimensions of the supplementary members 11 are 2 mm in length L7, 7 mm in width L8 and 1 mm in height L9. The supplementary members 11 are formed of the same material as the stator core 1. Notches 23 are cut into the supplementary members 11, and the stator teeth 14 are fitted into the notches 23.

Figure 17A:
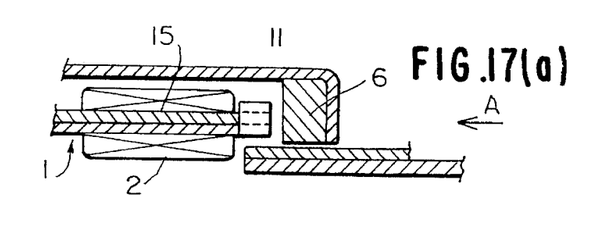
FIG. 17(a) is a cross-sectional view schematically illustrating the structure of the spindle motor 100 in the third embodiment.
Figure 17B:
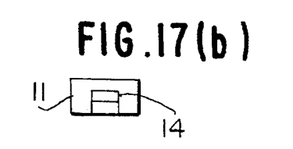
FIG. 17(b) illustrates the structure of FIG. 17(a) as viewed in the direction of arrow A.

Referring to FIGS. 17(a) and (b), the teeth 14 of the stator core 1 protrude in a direction away from the base plate 4.

The protrusion of the stator teeth 14 away from the base plate 4 enables the structure of the third embodiment to achieve the same effect as that of the second embodiment.

Fourth Embodiment

Now will be described a fourth preferred embodiment of the present invention.

The characteristic of this embodiment consists in the structure of the teeth 14 of the stator core 1. All other parts are structured in the same manner as the second embodiment.

Figure 18A:
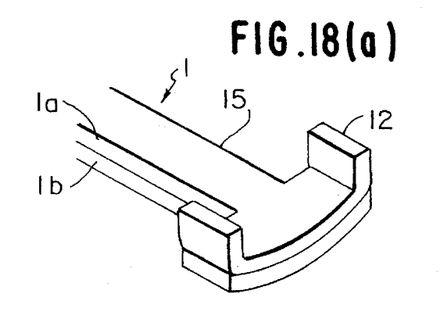
FIG. 18(a) is an oblique view schematically illustrating the stator teeth 14 of the stator core 1 in the fourth embodiment.
Figure 18B:
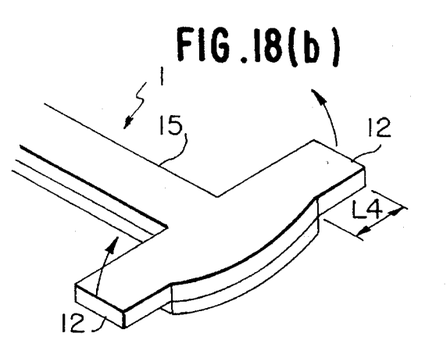
FIG. 18(b) is an exploded view schematically illustrating the structure of the stator teeth 14 of the stator core 1 in the fourth embodiment.

Referring to FIGS. 18(a) and (b), the stator core 1 of this embodiment is formed by stacking plate-shaped members 1a and 1b one over the other, and their teeth are T-shaped. At both ends of each tooth of the plate-shaped member 1a, which constitutes the top layer, are provided flanges 12. The flanges 12, measuring about 0.5 mm in length L4, are bent upward.

Figure 19:
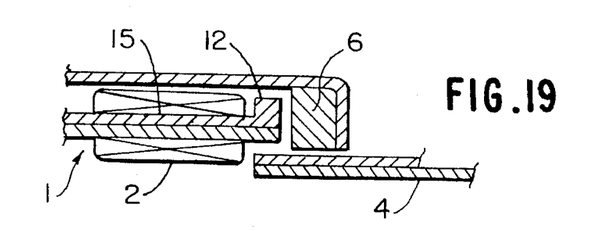
FIG. 19 is a cross-sectional view schematically illustrating the structure of the spindle motor 100 in the fourth embodiment.

Referring to FIG. 19, the flanges 12 protrude in a direction away from the base plate 4. As a result, the structure of this fourth embodiment can achieve the same effect as that of the second embodiment.

Fifth Embodiment

Next will be described a fifth preferred embodiment of the present invention.

The characteristic of this embodiment consists in the structure of the flanges 12 of the teeth 14 of the stator core 1. All other parts are structured in the same manner as the fourth embodiment.

Figures 20A, 20B:
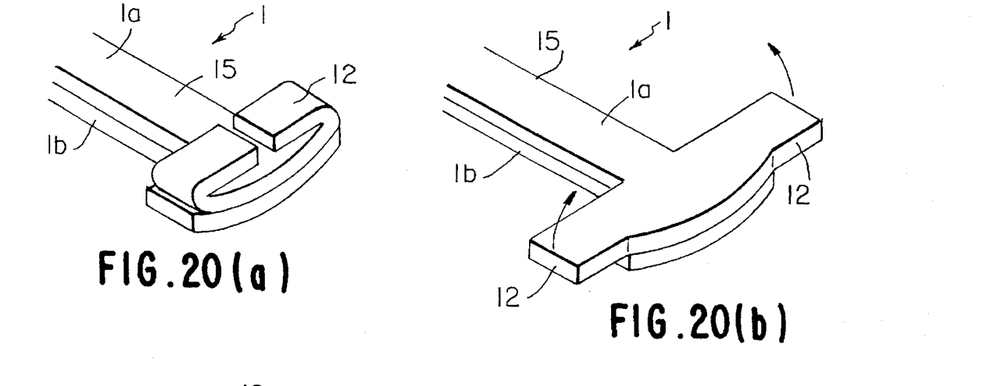
FIG. 20(a) is an oblique view schematically illustrating the stator teeth 14 of the stator core 1 in the fifth embodiment.
FIG. 20(b) is an exploded view schematically illustrating the structure of the stator teeth 14 of the stator core 1 in the fifth embodiment.

Referring to FIGS. 20(a) and (b), the flanges 12 are folded in this embodiment.

Figures 21, 22:
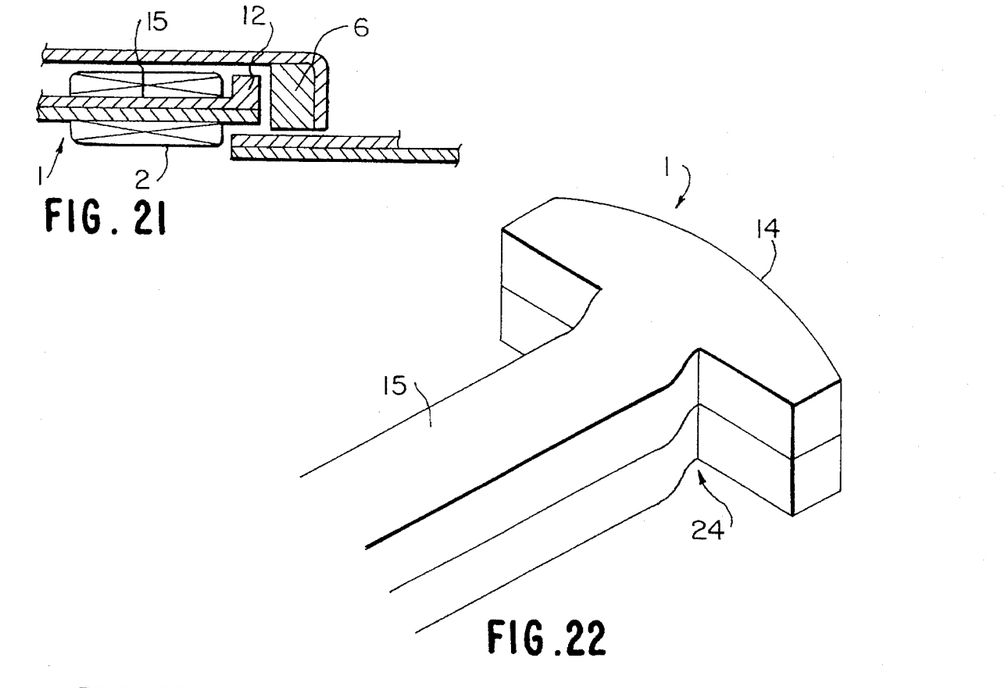
FIG. 21 is an oblique view schematically illustrating the structure of the spindle motor 100 in the fifth embodiment.
FIG. 22 is an cross-sectional view schematically illustrating the stator teeth 14 of the stator core 1 in the sixth embodiment.

Referring to FIG. 21, the folded flanges 12 protrude in a direction away from the base plate 4.

This fifth embodiment can achieve the same effect as the fourth embodiment.

Sixth Embodiment

Next will be described a sixth preferred embodiment of the present invention.

The characteristic of this embodiment consists in the structure of the poles 15 and the teeth 14 of the stator core 1. All other parts are structured in the same manner as the second embodiment.

Referring to FIG. 22, the teeth 14 of the stator core 1 of this embodiment have no supplementary members 11. Instead, the poles 15 of the stator core 1 are bent upward in the parts referred to by numeral 24.

Figure 23:
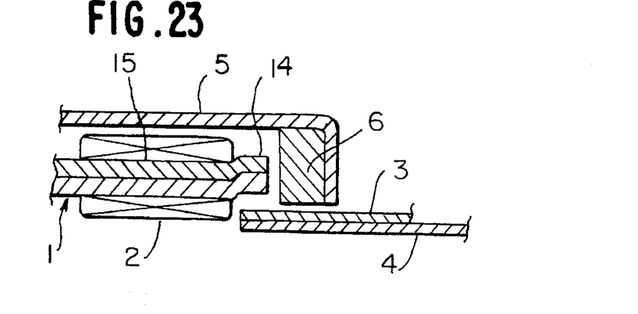
FIG. 23 is an cross-sectional view schematically illustrating the structure of the spindle motor 100 in the sixth embodiment.

Referring now to FIG. 23, the teeth 14 are shifted away by about 0.2 mm from the base plate 4 by the bent parts of the poles 15.

Figure 24A:
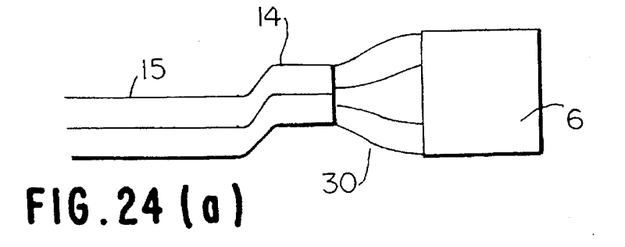
FIG. 24(a) is a cross-sectional view typically illustrating the magnetic field line pattern 30 in the structure shown in FIG. 23.
Figure 24B:
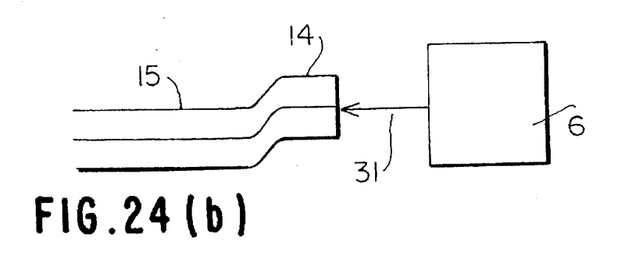
FIG. 24(b) is a cross-sectional view typically illustrating the magnetic force 31 acting between the stator core 1 and the magnet 6 in the structure shown in FIG. 23.
Figure 24C:
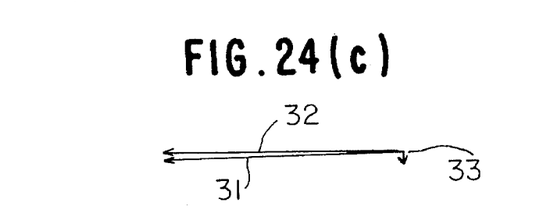
FIG. 24(c) is a diagram illustrating the radial component 32 and the axial component 33 of the magnetic force 31 shown in FIG. 24(b)

In the structure illustrated in FIG. 22, the magnetic field line shown in FIG. 24(a) is formed between the supplementary members 11 and the magnet 6. Referring to FIG. 24(b), the magnetic force 31, generating in the magnet 6, is so corrected as to work in a horizontal direction by the upward positioning of the stator teeth 14. Referring to FIG. 24(c), the axial component 33 of the magnetic force 31 is smaller than in the first embodiment shown in FIG. 10(c).

As described above, in this sixth embodiment, a part of each pole 15 of the stator core 1 is bent. This bending of the stator poles 15 shift the stator teeth 14 in a direction away from the base plate 4. The upward positioning of the stator teeth 14 reduces the axial component 33 of the magnetic force 31 acting between the stator core 1 and the magnet 6. Accordingly, the spindle motor 100 of this embodiment is improved over that of the first embodiment in rotational efficiency, deflections of the shaft 16 and the hub face 52, and wow.

Other Conceivable Embodiments of the Invention

The present invention may be embodied in other specific forms without departing from the spirit or essential characteristics thereof. The above description of the preferred embodiments therefore is to be considered in all respects as illustrative but not restrictive. All changes which come within the meaning and range of equivalency of the claims are therefore intended to be embraced therein.

For instance, in the structure of the first embodiment, openings need not be provided in both the PWB 3 and the base plate 4. The openings can be provided only in the PWB 3, for example. In another conceivable structure, the PWB 3 can have openings and the base plate 4, dents.

The supplementary members 11 in the second and third embodiments can have any other shape only if they protrude in a direction away from the base plate 4. Their shape should be altered according to the circumstances of the spindle motor to which they are applied.

Or, the characteristics of the second through sixth embodiments may be mutually combined. The characteristic of the second and third embodiments is the fitting of the supplementary members 11 to the teeth 14 of the stator core 1. That of the fourth and fifth embodiments is the fitting of the flanges 12 to the teeth 14 of the stator core 1 and their bending. That of the sixth embodiments is the bending of the poles 15 of the stator core 1 to shift the teeth 14 away from the base plate 4. For instance, by combining the characteristics of the first and third embodiments with that of the sixth, there can be obtained a structure in which the supplementary members 11 are fitted to the stator teeth 11 and the stator poles 15 are bent.

Furthermore, the characteristics of the second through sixth embodiments may be applied to the structure of something else than that of the first embodiment. Thus, the structures of the second through sixth embodiments can well be applied to a spindle motor whose base plate 4 has no openings.

What is claimed is:

1. A spindle motor comprising:

a base plate having a plurality of openings;

a disk-shaped rotor fitted rotatably to said base plate;

a magnet fitted to said rotor, said magnet arranged on a circumference of said rotor;

a stator core fixed to said base plate, said stator core being made of a magnetic material, said stator core including radially extending poles and teeth provided at the tips of said poles, and said stator core being arranged inside said magnet, with said teeth facing said magnet;

protruding parts provided at the tips of said teeth of said stator core, said protruding parts protruding in a direction away from said base plate;

coils corresponding to said openings of said base, each of said coils is wound around one of said poles of said stator core;

wherein a portion of each of said coils is received in corresponding one of said opening of said base; and wherein a printed wiring board is provided between said base plate and said stator core, openings are provided in said printed wiring board, and a part of each of said coils is inserted into one of said openings in said printed wiring board.

2. A spindle motor comprising:

a base plate having a plurality of openings;

a disk-shaped rotor fitted rotatably to said base plate;

a magnet fitted to said rotor, said magnet arranged on a circumference of said rotor;

a stator core fixed to said base plate, said stator core being made of a magnetic material, said stator core including radially extending poles and teeth provided at the tips of said poles, and said stator core being arranged inside said magnet, with said teeth facing said magnet;

protruding parts provided at the tips of said teeth of said stator core, said protruding parts protruding in a direction away from said base plate;

coils corresponding to said openings of said base, each of said coils is wound around one of said poles of said stator core;

wherein a portion of each of said coils is received in corresponding one of said opening of said base; and wherein a printed wiring board is provided between said base plate and said stator core, second openings are provided in said printed wiring board, each of said openings in said base plate matches one of said second openings in said printed wiring board, and a part of each of said coils is inserted into one of said openings in said base plate and into one of said second openings in said printed wiring board.

3. A spindle motor comprising:

a base plate having a plurality of openings;

a disk-shaped rotor fitted rotatably to said base plate;

a magnet fitted to said rotor, said magnet arranged on a circumference of said rotor;

a stator core fixed to said base plate, said stator core being made of a magnetic material, said stator core including radially extending poles and teeth provided at the tips of said poles, and said stator core being arranged inside said magnet, with said teeth facing said magnet; and coils corresponding to said openings of said base, each of said coils is wound around one of said poles of said stator core;

wherein a part of each of said poles of said stator core is bent, at a point prior to said teeth, in a direction away from said base plate, and a portion of each of said coils is received in corresponding one of said openings of said base, and wherein a printed wiring board is provided between said base plate and said stator core, openings are provided in said printed wiring board, and a part of each of said coils is inserted into one of said openings in said printed wiring board.

4. A spindle motor comprising:

a base plate having a plurality of openings;

a disk-shaped rotor fitted rotatably to said base plate;

a magnet fitted to said rotor, said magnet arranged on a circumference of said rotor;

a stator core fixed to said base plate, said stator core being made of a magnetic material, said stator core including radially extending poles and teeth provided at the tips of said poles, and said stator core being arranged inside said magnet, with said teeth facing said magnet; and coils corresponding to said openings of said base, each of said coils is wound around one of said poles of said stator core;

wherein a part of each of said poles of said stator core is bent, at a point prior to said teeth, in a direction away from said base plate, and a portion of each of said coils is received in corresponding one of said openings of said base, and wherein a printed wiring board is provided between said base plate and said stator core, second openings are provided in said printed wiring board, each of said openings in said base plate matches one of said second openings in said printed wiring board, and a part of each of said coils is inserted into one of said openings in said base plate and into one of said second openings in said printed wiring board.

* * * * *